US009489570B2

(12) United States Patent
Cao et al.

(10) Patent No.: US 9,489,570 B2
(45) Date of Patent: Nov. 8, 2016

(54) METHOD AND SYSTEM FOR EMOTION AND BEHAVIOR RECOGNITION

(71) Applicant: KONICA MINOLTA LABORATORY U.S.A., INC., San Mateo, CA (US)

(72) Inventors: Chen Cao, Gainesville, FL (US); Yongmian Zhang, Union City, CA (US); Haisong Gu, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 198 days.

(21) Appl. No.: 14/145,132

(22) Filed: Dec. 31, 2013

(65) Prior Publication Data

US 2015/0186713 A1    Jul. 2, 2015

(51) Int. Cl.
| | | |
|---|---|---|
| *G06K 9/00* | (2006.01) | |
| *G06K 9/62* | (2006.01) | |
| *G06T 7/00* | (2006.01) | |
| *G06K 9/46* | (2006.01) | |
| *G06T 7/20* | (2006.01) | |
| *G06K 9/32* | (2006.01) | |

(52) U.S. Cl.
CPC ....... *G06K 9/00342* (2013.01); *G06K 9/00369* (2013.01); *G06K 9/00718* (2013.01); *G06K 9/469* (2013.01); *G06K 9/4642* (2013.01); *G06K 9/6212* (2013.01); *G06T 7/0044* (2013.01); *G06K 9/00771* (2013.01); *G06K 9/3241* (2013.01); *G06T 7/20* (2013.01); *G06T 7/2033* (2013.01); *G06T 2207/10016* (2013.01); *G06T 2207/20076* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2007/0237387 | A1* | 10/2007 | Avidan | G06K 9/00369 382/159 |
| 2011/0293137 | A1* | 12/2011 | Gurman | G06K 9/00201 382/103 |
| 2013/0278501 | A1* | 10/2013 | Bulzacki | G06F 3/017 345/157 |

(Continued)

OTHER PUBLICATIONS

Ohn-Bar, et al., "Joint Angles Similarities and HOG2 for Action Recognition," IEEE Conference on Computer Vision and Pattern Recognition Workshops, Computer Society, 2013, pp. 465-470, IEEE.

(Continued)

*Primary Examiner* — Siamak Harandi
*Assistant Examiner* — Pinalben Patel
(74) *Attorney, Agent, or Firm* — Buchanan Ingersoll & Rooney PC (57) ABSTRACT

A method and system for recognizing behavior is disclosed, the method includes: capturing at least one video stream of data on one or more subjects; extracting body skeleton data from the at least one video stream of data; computing feature extractions on the extracted body skeleton data to generate a plurality of 3 dimensional delta units for each frame of the extracted body skeleton data; generating a plurality of histogram sequences for each frame by projecting the plurality of 3 dimensional delta units for each frame to a spherical coordinate system having a plurality of spherical bins; generating an energy map for each of the plurality of histogram sequences by mapping the plurality of spherical bins versus time; applying a Histogram of Oriented Gradients (HOG) algorithm on the plurality of energy maps to generate a single column vector; and classifying the single column vector as a behavior and/or emotion.

16 Claims, 7 Drawing Sheets

(56) References Cited

U.S. PATENT DOCUMENTS

| | | | | |
|---|---|---|---|---|
| 2014/0169623 A1* | 6/2014 | Liu | ................... | G06K 9/00342 382/103 |
| 2014/0341421 A1* | 11/2014 | Porikli | ............... | G06K 9/00369 382/103 |
| 2015/0092980 A1* | 4/2015 | Folmer | ................ | A61B 5/4866 382/103 |

OTHER PUBLICATIONS

Xia, et al., "View Invariant Human Action Recognition Using Histograms of 3D Joints," 2012. pp. 20-27, IEEE.

Yang, et al., "Recognizing Actions Using Depth Motion Maps-based Histograms of Oriented Gradients," 2012, pp. 1-4, ACM.

Tran, et al, "Sparse Spatio-Temporal Representation of Joint Shape-Motion Cues for Human Action Recognition in Depth Sequences," IEEE RIVF International Conference on Computing & Communication Technologies—Research, innovation, and Vision for the Future (RIVF), 2013, pp. 253-258, IEEE.

Wang, et al., "Mining Actionlet Ensemble for Action Recognition with Depth Cameras," 2012, pp. 1290-1297, IEEE.

Dalal, et al., "Histograms of Oriented Gradients for Human Detection," IEEE Computer Society Conference on Computer Vision and Pattern Recognition (CVPR '05), 2005, IEEE.

Extended European Search Report issued on Jun. 16, 2015, by the European Patent Office in corresponding European Patent Application No. 14194014.8-1901. (8 pages).

J. Wang et al., "Robust 3D Action Recognition with Random Occupancy Patterns", Computer Vision-ECCV 2012 IEEConference, Springer, pp. 872-885.

X. Yang et al., "Recognizing Actions Using Depth Motion Maps-based Histograms of Oriented Gradients", Proceedings of the 20th ACM International Conference on Multimedia, 2012, pp. 1057-1060.

W. Li et al., "Action Recognition Based on a Bag of 3D Points", In Computer Vision and Pattern Recognition Workshops (CVPRW), 2010 IEEE Computer Society Conference, 2010, pp. 9-14.

O. Oreifej et al., "HON4D: Histogram of Oriented 4D Normals for Activity Recognition from Depth Sequences", pp. 1-8.

J. Wang et al., "Mining Actionlet Ensemble for Action Recognition with Depth Cameras", Computer Vision and Pattern Recognition, 2012 IEEE Conference, 2012, pp. 1290-1297.

C. Wang et al., "An approach to pose-based action recogntion"In Computer Vision and Pattern Recognition, 2013 IEEE Conference, pp. 915-922.

\* cited by examiner

METHOD AND SYSTEM FOR EMOTION AND BEHAVIOR RECOGNITION

FIELD OF THE INVENTION

The present disclosure relates to a method and system for emotion and behavior recognition, which can include emotion detection, and wherein the method and systems can be applied to monitor real-time human emotion and behavior.

BACKGROUND

Facial expressions and human actions can be used for emotion and behavior detection. Action recognition can also be used to automatically recognize human actions and/or detection of emotion for a variety of practical applications such as video surveillance, human computer interaction, and emotion detection. With the new technology of 3D sensor and posture estimation, action recognition approaches based on depth and skeleton information can be performed, which can take the place of the traditional color video-based methods.

SUMMARY

In consideration of the above issues, it would be desirable to have a method and system, which detects emotion and behavior using a method and system of body gesture detection, which can rely on body joint information with a reduced computing time.

In accordance with an exemplary embodiment, a method for recognizing behavior is disclosed, the method comprising: capturing at least one video stream of data on one or more subjects; extracting body skeleton data from the at least one video stream of data; computing feature extractions on the extracted body skeleton data to generate a plurality of 3 dimensional delta units for each frame of the extracted body skeleton data; generating a plurality of histogram sequences for each frame by projecting the plurality of 3 dimensional delta units for each frame to a spherical coordinate system having a plurality of spherical bins; generating an energy map for each of the plurality of histogram sequences by mapping the plurality of spherical bins versus time; applying a Histogram of Oriented Gradients (HOG) algorithm on the plurality of energy maps to generate a single column vector; and classifying the single column vector as a behavior and/or emotion.

In accordance with an exemplary embodiment, a system for recognition of behavior is disclosed, the system comprising: a video camera configured to capture at least one video stream of data on one or more subjects; and one or more modules having executable instructions for: extracting body skeleton data from the at least one video stream of data; computing feature extractions on the extracted body skeleton data to generate a plurality of 3 dimensional delta units for each frame of the extracted body skeleton data; generating a plurality of histogram sequences for each frame by projecting the plurality of 3 dimensional delta units for each frame to a spherical coordinate system having a plurality of spherical bins; generating an energy map for each of the plurality of histogram sequences by mapping the plurality of spherical bins versus time; applying a Histogram of Oriented Gradients (HOG) algorithm on the plurality of energy maps to generate a single column vector; and classifying the single column vector as a behavior and/or emotion.

In accordance with an exemplary embodiment, a non-transitory computer readable medium containing a computer program having computer readable code embodied therein for recognition of behavior is disclosed, comprising: extracting body skeleton data from at least one video stream of data; computing feature extractions on the extracted body skeleton data to generate a plurality of 3 dimensional delta units for each frame of the extracted body skeleton data; generating a plurality of histogram sequences for each frame by projecting the plurality of 3 dimensional delta units for each frame to a spherical coordinate system having a plurality of spherical bins; generating an energy map for each of the plurality of histogram sequences by mapping the plurality of spherical bins versus time; applying a Histogram of Oriented Gradients (HOG) algorithm on the plurality of energy maps to generate a single column vector; and classifying the single column vector as a behavior and/or emotion.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to the embodiments of the invention, examples of which are illustrated in the accompanying drawings. Wherever possible, the same reference numbers are used in the drawings and the description to refer to the same or like parts.

In accordance with an exemplary embodiment, a method and system for emotion and behavior detection by body gesture and action is disclosed. The method and system can be used to detect emotion and behavior based on the detection of body gestures in combination with corresponding movements of body joints in a three-dimensional (3D) space.

Figure 3:
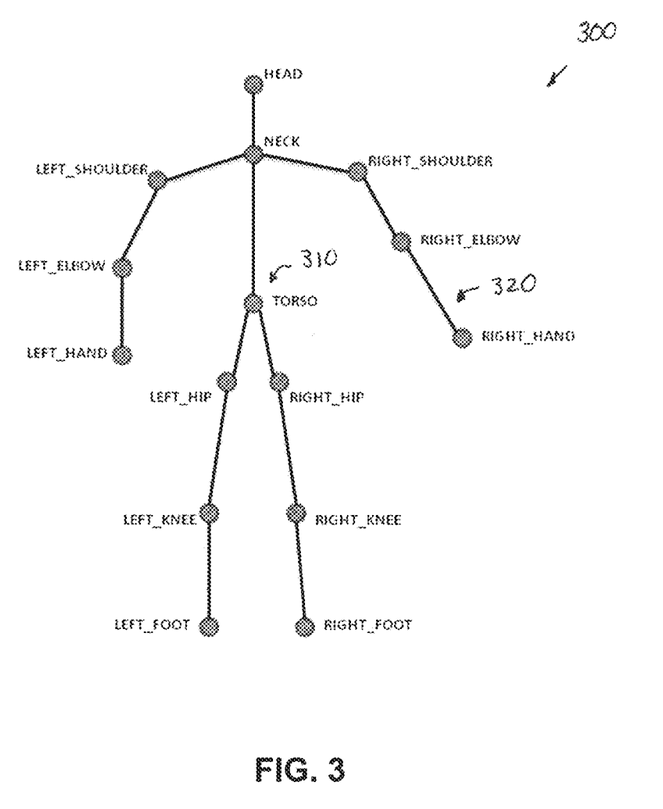
FIG. 3 shows a human body having 15-joints obtained by 3D sensor, and wherein for each point, a three dimensional position (X, Y, D) can be obtained in accordance with an exemplary embodiment.

In accordance with an exemplary embodiment, a 3D sensor/video camera or video input can be used to record body actions while one or more subjects are performing a series of movements. The body joints, for example, can consist of 15 body joints (or points) as shown in FIG. 3, which can be estimated from each frame of the 3D video as a function of the sensor. In accordance with an exemplary embodiment, basic features, such as pose, speed, and movement information can then be extracted frame by frame to describe the movement of the subject. These extracted features (i.e., pose, speed and movement) can then be computed from the magnitude and orientation of the one or more pairs of joints. A histogram sequence can be built as a statistical projection of the extracted features, and histogram of oriented gradients algorithm (HOG) can be employed on the sequence to obtain a vector descriptor, which corresponds or describes the emotion or behavior as detected in the video. A classification engine such as the linear SVM can then be used to classify the generated vector descriptor as an emotion and/or action.

Figure 1:
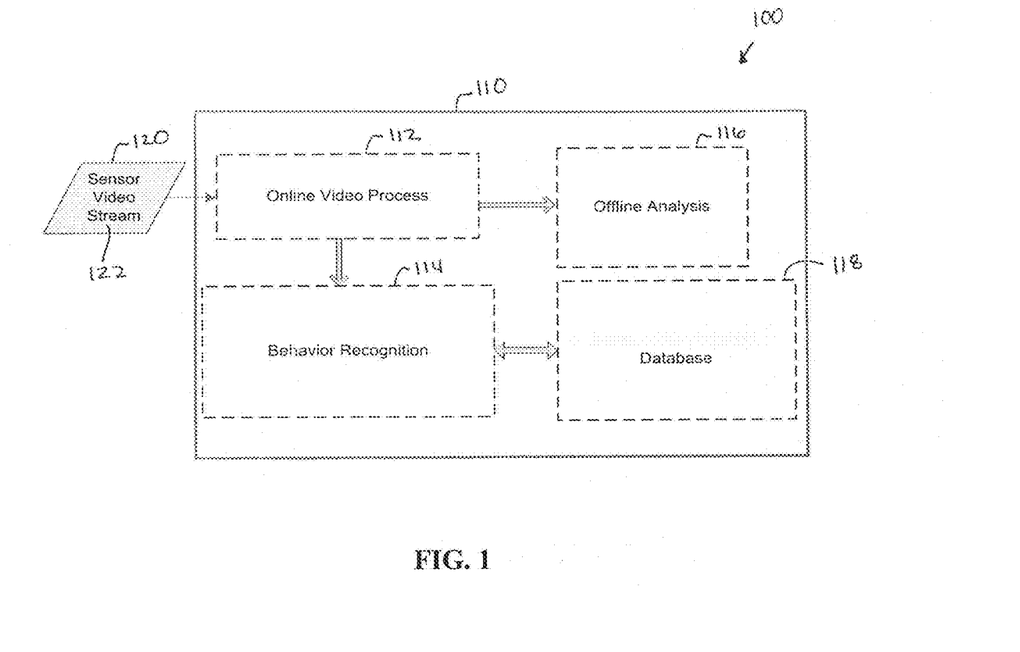
FIG. 1 shows a system for detection of behavior in accordance with an exemplary embodiment.

In accordance with an exemplary embodiment, the present disclosure relates to a system and method for recognition of emotion and behavior based on the detection of movement of corresponding pairs of body joints. The behavior recognition system 100 can include, for example, a processing module or system 110, which can include a video process module 112, a behavior recognition module 114, an offline analysis module 116, and a classification database module 118. Each of the modules 112, 114, 116, 118 can include one or more computer or processing devices having a memory, a processor, an operating system and/or software and/or an optional graphical user interface (GUI) and/or display. It can be appreciated that, for example, each of the modules 112, 114, 116, 118 can be combined in one computer device, for example, a standalone computer, or can be contained within one or more computer devices, wherein each of the one or more computer devices has a memory, a processor, an operating system and/or software, and a graphical user interface (GUI) or display.

Figure 6:
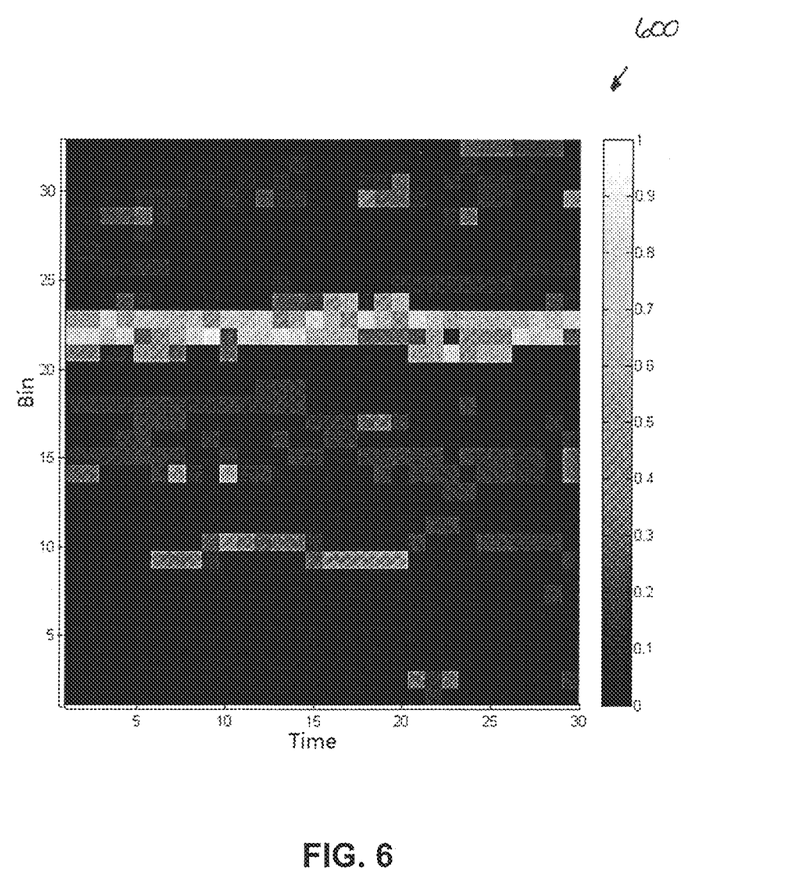
FIG. 6 shows an energy map representation of a histogram sequence, wherein the X-axis is the frame length and the Y-axis is the bins of orientation computed from basic features in accordance with an exemplary embodiment.
Figure 7:
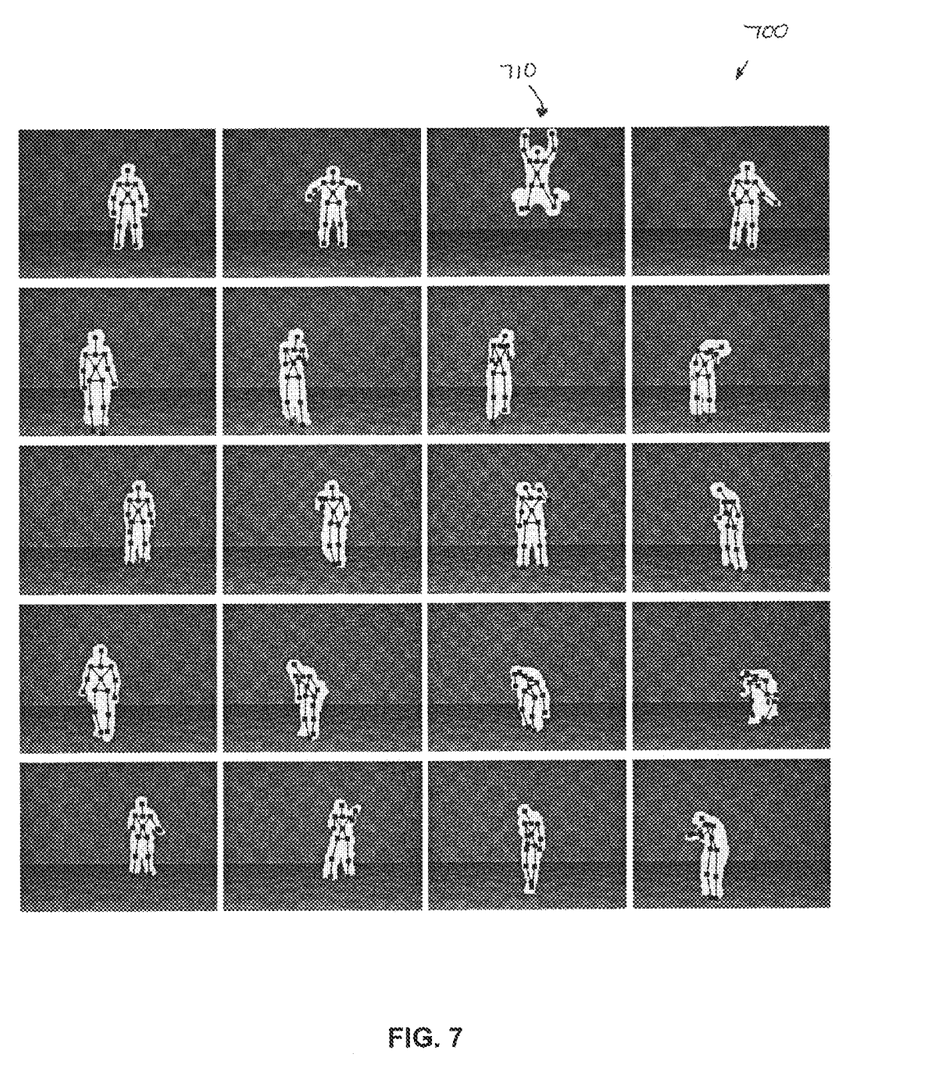
FIG. 7 shows sample profiles in an exemplary emotion and/or behavior dataset in accordance with an exemplary embodiment.

As shown in FIG. 1, the processing module or system 110 includes an online video process module 112, a behavior recognition module 114, an offline analysis module 116, and a database module 118. In accordance with an exemplary embodiment, the online video process module 112 can be used to monitor, capture and extract body skeleton joint data (FIG. 3) from video frames received from a video stream 122 received from a video camera 120. The offline analysis module 112 can save the captured skeleton frames into one or more files and provides a database management interface for managing the behavior classification database module 118. In accordance with an exemplary embodiment, the online process module 112 extracts behavior features from input raw data received from an original video stream 122 depicting one or more subjects 710 (FIG. 7). The extracted behavior features can then be fed into the behavior recognition module 114, which performs a basic feature extraction 240 (FIG. 4), a spherical bin projection 250 (FIG. 5), an oriented histogram sequence 260 (FIG. 6), and application of a Histogram of Oriented Gradients (HOG) on the oriented histogram sequence 260 to obtain a single column vector or descriptor. The single column vector or description can then be input into (i.e., analyzed by) a machine-learning classifier for recognition or detection of the emotion or behavior associated with the video input 122 of the subject 710. In accordance with an exemplary embodiment, the machine-learning classifier can be hosted within the database module 118.

In accordance with an exemplary embodiment, the offline analysis module 116 can provide a user interface for manually enrolling and managing the behavior classification database module 118. The behavior classification database module 118 can be configured to include a database of identifiable features, for example, single column vector or descriptors, which can be associated with classified behaviors and/or emotions. For example, in accordance with an exemplary embodiment, the system 100 can be used as a variable environment human behavior detection system, which can detect behavior, such as falling down, and/or general mood or emotion, which can be used, for example, for health care detection and prevention.

In accordance with an exemplary embodiment, the original video stream or video input 122 can be generated using one or more motion and/or depth sensors, in combination with, for example, video cameras 120 and/or other known motion and depth sensors and/or devices. In accordance with an exemplary embodiment, rather than a separate motion or depth sensor in combination with a video camera, the original video stream 122 can be obtained using 3D (three-dimensional) video camera technology. The data extracted from the original video stream 120 can be saved into a file and/or can be directly input into the video processing module 112 and/or the behavior recognition module 114 from the 3D video camera 120.

Figure 2:
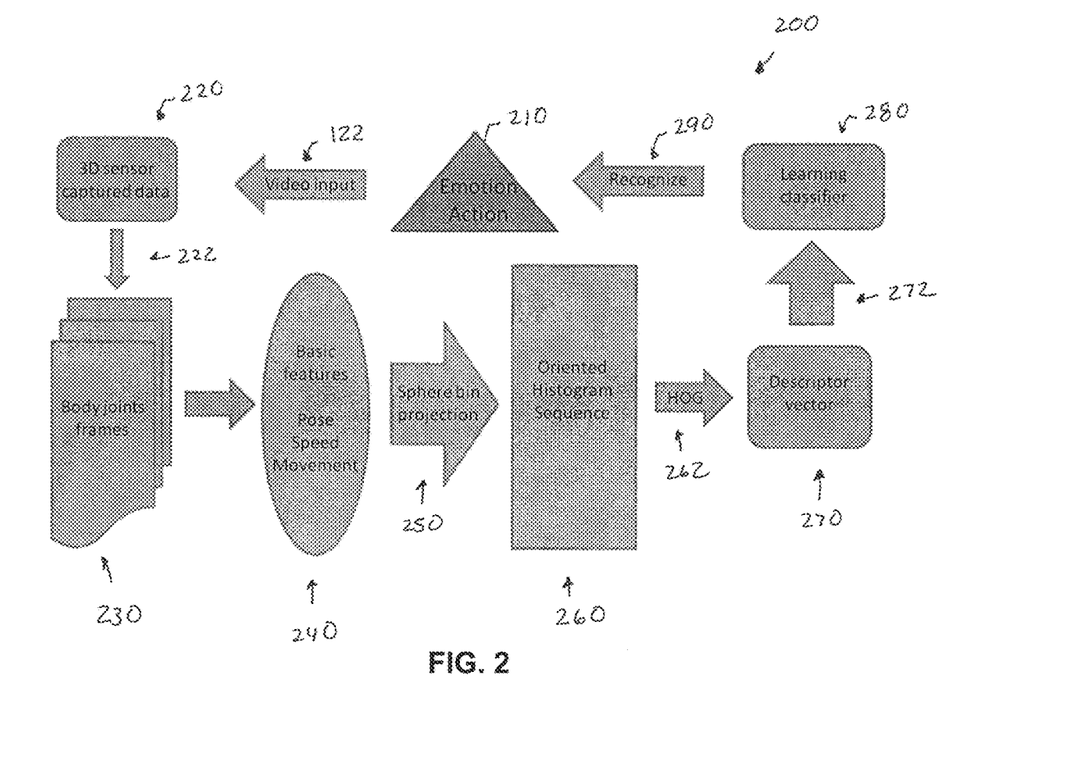
FIG. 2 shows a flowchart of a system in accordance with an exemplary embodiment.

FIG. 2 is a flow chart of the behavior recognition system 200 for detecting behavior including emotion detection in accordance with an exemplary embodiment. As shown in FIG. 2, the system 200 includes a video input or video stream 122, which includes a behavior, an emotion and/or an action 210 of a subject 710 (FIG. 7). The subject 710 can be, for example, a human, an animal, and/or any other living creature.

In accordance with an exemplary embodiment, the video input 122 is fed into the video process module 112, which processes the video input 122 into captured data 220, which can then be forwarded 222 to the behavior recognition module 116. The behavior recognition module 116 can include one or modules, which can extract from the captured data, the body joint frames 230 for each of the frames and the basics features 240 including pose, speed and movement of one or more pairs of body joints 310 (FIG. 3).

In accordance with an exemplary embodiment, after extraction of the basic features 240, including pose, speed and movement, for each of the basic features 240, a delta unit (i.e., change in a three-dimensional position (X, Y, D)) for each of the extracted features from the original Cartesian coordinate is projected to a spherical coordinate using a spherical bin projection unit 250. Each of the spherical bin projections is then converted into an energy map 600 (FIG. 6) using an oriented histogram sequence unit 260. The histogram sequence acts as an energy map 600 to display the joints moving orientation and temporal change of an action.

A Histogram of Oriented Gradients (HOG) algorithm 262 can then be applied on the plurality of energy maps 600 to obtain a single column vector (or descriptor vector) 270. The single column vector or descriptor vector 270 is fed 272 into a machine-learning algorithm (learning classifier) 280, which for example, can be hosted within the classification database module 118, for action categorization learning and recognition. In accordance with an exemplary embodiment, the machine-learning algorithm 280 recognizes the vector 270 and classifies 290 the action or emotion 210.

FIG. 3 illustrates a skeleton representation 300 for an exemplary user facing the sensor and/or video camera, or alternatively, a 3D sensor/camera 122 in accordance with an exemplary embodiment. As shown in FIG. 3, the human skeleton can consist of 15 joints (or points) 310 and 11 corresponding line segments 320 representing the head, shoulders and limbs of a human body. As shown in FIG. 3, the line segments 320 are mutually connected by joints 310 and the movement of one segment 320 can be constrained by others. Furthermore, for example, a few of the parts or line segments 320 can perform the independent motion while the others may stay relatively stationary, for example, such as a head movement. In accordance with an exemplary embodiment, for example, the torso (or center point) of the chest can be used as a reference point for the methods and processes as described herein. It can be appreciated that for non-human detection or recognition, a corresponding skeleton, for example, for a dog or cat, can be generated.

In accordance with an exemplary embodiment, the human action or emotions can be captured using a 3D sensor or video input, which can identify the relative position of each of the body joints in 3D. For example, in accordance with an exemplary embodiment, each of the 15 joints 310 and corresponding line segments 320 can be captured for each frame of action. In addition, for each joint 310, a three-dimensional position (X, Y, D) can be obtained. In accordance with an exemplary embodiment, the three-dimensional position of each of the joints 310 can be described as (X, Y, D) in a Cartesian coordinate system.

Figure 4:
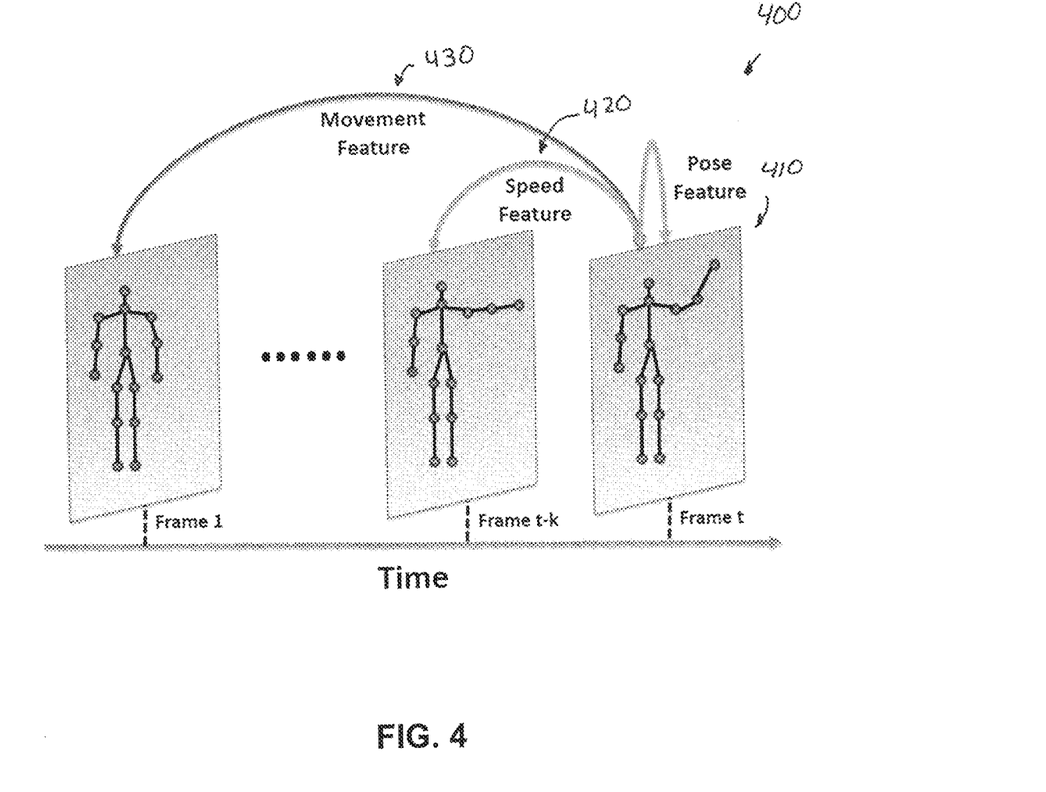
FIG. 4 shows a chart, which displays how pose, speed and movement features can be extracted from a video input in accordance with an exemplary embodiment.

FIG. 4 shows a chart displaying how pose, speed and movement features can be extracted in accordance with an exemplary embodiment. As shown in FIG. 4, an action video with T frames and N joints in each frame can be represented as a set of 3D points sequence, written as v= $\{x_n^t \epsilon R^3 | n=1, \ldots, N; t=1, \ldots, T\}$. In accordance with an exemplary embodiment, for example, with a human skeleton consisting of 15 joints (or points) 310 and 11 corresponding line segments 320, the system 100, can include N=15 and T varies for each different sequence. It can be appreciated that the human skeleton can include more or less than 15 joints 310 and 11 corresponding line segments 320, and the corresponding calculation can be modified and/or adjusted based on the number of joints 310 and corresponding line segments 320.

In accordance with an exemplary embodiment, the first step of feature extraction is to compute basic features for each frame, which describes the pose, speed, and movement information of each and every joint in a single frame.

In accordance with an exemplary embodiment, for example, the pose feature 410 $f_p(x_n^t)$ can describe the relative position between joint n and every other joint in each frame t, written as $f_p(x_n^t) = \{x_n^t - x_i^t | i=1, \ldots, N; i \neq n; t=1, \ldots, T\}$. For example, for each of the N joints, there is a T-length sequence with (N−1) dimensional elements (subtraction results) in each frame. The pose feature can capture the body posture in every frame.

In accordance with an exemplary embodiment, the speed feature 420 $f_s(x_n^t)$ can describe the relative position between joint n in frame t and every joint in a preceding frame (t−k), where k is the parameter of speed estimation step size. This parameter can depend on the frame rate of recorded action video, and can be the minimum gap between frame (t−k) and frame t to show an obvious movement for a joint n if it has a significant activity during that period. In accordance with an exemplary embodiment, the speed feature can be written as $f_s(x_n^t) = \{x_n^t - x_i^{t-k} | i=1, \ldots, N; t=k+1, \ldots, T; k>0\}$. As its name implies, the speed feature 420 provides the information how fast body moves in every frame.

In accordance with an exemplary embodiment, the movement feature 430 $f_m(x_n^t)$ can describe the relative position between joint n in frame t and every joint in the first frame, written as $f_m(x_n^t) = \{x_n^t - x_i^1 | i=1, \ldots, N; t=2, \ldots, T\}$. For example, for a well-segmented or aligned action video, the starting frame is preferably initially static, i.e., no movement feature. In accordance with an exemplary embodiment, the movement feature 430 can capture the body movement in every frame compared to the initial status.

Figure 5:
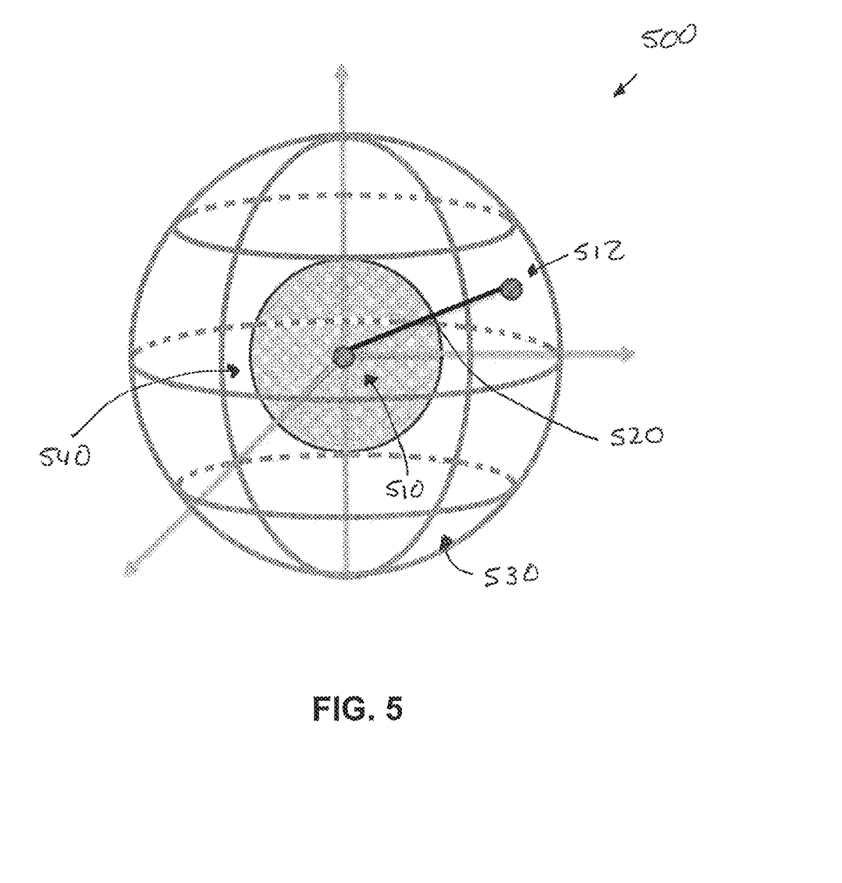
FIG. 5 shows a concentric spherical bin representation of a pair of joints in accordance with an exemplary embodiment.

In accordance with an exemplary embodiment, since each joint contains 3D coordinate information (X, Y, D), any subtraction unit $x_i^{t1} - x_j^{t2}$ can also result in a three-dimensional delta unit (ΔX, ΔY, ΔD). After the extraction of basic features, each delta unit from the original Cartesian coordinate can be projected to sphere coordinate, for example, (ΔX, ΔY, ΔD)→(r, θ, φ), and a bin histogram can be used to represent these spherical angles. FIG. 5 shows a concentric sphere bin 500 representation of a pair of joints 510, 512 in accordance with an exemplary embodiment. As shown in FIG. 5, each point (or small circle) 510, 512 represents a joints and a line 520 as the link, which connects them. For example, one joint 510 can be set as an origin (or base point) to build the sphere, and another joint 512 can have coordinate value (r, θ, φ).

In accordance with an exemplary embodiment, the sphere 500 can be cut into 32 equal bins 530, according to the angles in both latitude and longitude. It can be appreciated that the sphere 500 can be cut into any number of spheres as a power of two, for example, 2, 4, 8, 16, 32, 62, 128, etc. In accordance with an exemplary embodiment, for example, the joint pair 510, 512 can be located in one or more of these bins 530. Furthermore, to eliminate the minor movement noise, a 33$^{rd}$ bin 540 can be added, as an inner ball or sphere, with a radius R. When the line length r<R, the status is called "neighbor" between two joints. This is an independent status other than the 32 orientation bins. The parameter R is set to balance the bin distribution. For example, sample 3D values from the basic features and set R to make ⅓₃ of the data into the "neighbor" bin.

FIG. 6 shows one of these histogram sequences 600 from a sample video with 30 frames. In accordance with an exemplary embodiment, the statistics of the histogram can be based on $\{f_z(x_n^t) | z \in \{p, s, m\}\}$ with each reference joint (taken as origin) n at each frame t. For example, for an action video, the system can have 3N histogram sequences with length T for each of them.

In accordance with an exemplary embodiment, the histogram sequence acts as an energy map 600 to display the joints moving orientation and temporal change of an action. In accordance with an exemplary embodiment, to further abstract the more concise spatio-temporal descriptor for machine-learning, a Histogram of Oriented Gradients (HOG) algorithm 262 can be employed on the map to obtain a single column vector 270. In accordance with an exemplary embodiment, the map 600 can be equally divided into several 50% overlapped regions (i.e., a "cell"). For each point in a cell, the Y-gradients can be the difference between its upper and lower neighbor in Y-axis, and the X-gradients is the difference between its right and left neighbor in X-axis. The tangent angle according to Y-gradients/X-gradients can be computed and project into several bins to form a histogram within the cell. The HOG descriptor can be the concatenation of the histograms for all of the cells.

For example, for an action video, the 3N histogram sequences will result in 3N such HOG representations, where N is the number of joints detected. In accordance with an exemplary embodiment, a plurality of HOG representations can be concatenated to form a single column vector as the final video descriptor for classification of the action using, for example, a machine-learning algorithm. In accordance with an exemplary embodiment, a linear SVM can be employed as a machine-learning algorithm for action categories learning and recognition. For a video v among total V videos in training/testing set, the descriptor computed by the method as disclosed is $d_v$, the category label is $c=1$ positive and $c=-1$ negative. In accordance with an exemplary embodiment, the goal of the system can be to find a linear classifier w with $w \cdot d_v > 0$ for all positive labeled data and $w \cdot d_v < 0$ for all negative data, by optimizing $\arg\min_w \{½\|w\|^2 + C \Sigma_{v=1}^{V}(1 - cw \cdot d_v)\}$. When there are C categories in total, there will be trained C classifiers $w_{c \in C}$ through 1-vs-all strategy. The recognition decision rule is that $d_v$ belongs to $\max_{c \in C}(w_c \cdot d_v)$.

In accordance with an exemplary embodiment, for example, an estimate of the running time of the disclosed feature extraction method on 1000 video sequences (joints position already estimated) with averagely 50 frames per sequence, and the number joints in each frame is 15 for a method and system as disclosed herein. For example, the feature extraction time can be 43.07 milliseconds per sequence, with C++ code running on a PC of 2.5 GHz CPU and 6 GB memory. Thus, in accordance with an exemplary embodiment, the method and system as disclosed herein, can be used as a real-time action recognition system.

FIG. 7 shows sample profiles in an exemplary emotion and/or behavior dataset 700 in accordance with an exemplary embodiment. In accordance with an exemplary embodiment, a dataset focused on human emotion states recognition via 3D sensor was collected. Six subjects 710 were asked to perform 11 emotion actions, with one subject asked to perform one action twice, which resulted in 132 action sequences. By manual labeling the starting and ending frames, the valid sequence of each action was obtained. The average length of valid sequence was approximately 86 frames per action for the dataset.

In accordance with an exemplary embodiment, the 11 actions collected belong to six emotion states. Based on elements from psychological studies, these states can be uniformly recognized across cultures and are therefore invaluable in trying to analyze the subjects' emotions. The detailed information of the dataset is listed in Table 1. FIG. 7 lists more profile images of emotion states in our dataset.

TABLE 1

Self-collected emotion dataset information

| Emotion Type | Happy1, Happy2, Sad1, Sad2 Anger1, Anger2, Fear1, Fear2 Disgust1, Disgust2, Surprise |
|---|---|
| Data Format | RGB-Depth video Foreground map (.bin) per frame 15 joints (3D position) per frame |

In accordance with an exemplary embodiment, an exemplary linear SVM for the emotion detection task of our dataset was proposed. Due to the action variety of this dataset, a leave-one-out cross subject test was performed, for example, five subjects can be used for training and the remained one for testing. In accordance with an exemplary embodiment, all possible train/test splits and compute the average, wherein the average recognition rate is 73.5%.

In accordance with an exemplary embodiment, the recognition accuracy on the most popular public dataset for general action recognition, and compared with the state-of-the-art approaches in this application was evaluated.

In accordance with an exemplary embodiment, an MSR Action3D Dataset had 20 actions are performed by 10 subjects with 20 joints in each frame. The 20 actions were divided into 3 subsets for 3 tasks of action recognition. For each task, half subjects were used for training while the other half are for testing. The numerical results are listed in table 2.

TABLE 2

Experimental comparison on MSR Action3D dataset

| Methods | Accuracy (%) |
|---|---|
| Action graph | 74.70 |
| Depth motion map | 85.52 |
| Random occupation pattern | 86.50 |
| Fourier transform and actionlet | 88.20 |
| HOG4D in 600-cell | 88.89 |
| Spatio-temporal parts mining | 90.22 |
| Our method | 93.14 |

In accordance with an exemplary embodiment, a non-transitory computer readable medium containing a computer program having computer readable code embodied therein for recognition of behavior is disclosed, which comprises: extracting body skeleton data from at least one video stream of data; computing feature extractions on the extracted body skeleton data to generate a plurality of 3 dimensional delta units for each frame of the extracted body skeleton data; generating a plurality of histogram sequences for each frame by projecting the plurality of 3 dimensional delta units for each frame to a spherical coordinate system having a plurality of spherical bins; generating an energy map for each of the plurality of histogram sequences by mapping the plurality of spherical bins versus time; applying a Histogram of Oriented Gradients (HOG) algorithm on the plurality of energy maps to generate a single column vector; and classifying the single column vector as a behavior and/or emotion.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

The method and system for behavior recognition as disclosed herein may be implemented using hardware, software or a combination thereof. In addition the method and system for behavior recognition as disclosed herein may be implemented in one or more computer systems or other processing systems, or partially performed in processing systems such as personal digit assistants (PDAs). In yet another embodiment, the invention is implemented using a combination of both hardware and software.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recognizing behavior, the method comprising:
   capturing at least one video stream of data on one or more subjects, wherein the at least one video stream data comprises a plurality of frames;
   extracting body skeleton data from each frame of the at least one video stream of data;
   computing feature extractions on each joint of the extracted body skeleton data for each frame of the extracted body skeleton data, wherein the extracted features of the joint of the body skeleton describes a speed feature, a movement feature, and a pose feature of the joint of the body skeleton data, and wherein the speed feature describes a relative position between joint n in frame t and every joint in a preceding frame (t−k), where k is a parameter of speed estimation step size;
   generating a plurality of histograms for each frame by respectively projecting the extracted features for each frame to a spherical coordinate system having a plurality of spherical bins;
   generating an energy map for each of the plurality of histograms by mapping the plurality of spherical bins versus time;
   applying a Histogram of Oriented Gradients (HOG) algorithm on the plurality of energy maps to generate a single column vector; and
   classifying the single column vector as a behavior and/or emotion.

2. The method of claim 1, wherein the pose feature describes a relative position between joint n and every other joint in each frame t.

3. The method of claim 1, wherein the parameter depends on the frame rate of recorded action video, and can be a minimum gap between frame (t−k) and frame t to show an obvious movement for a joint n if it has a significant activity during that period.

4. The method of claim 1, wherein the movement features describes the relative position between joint n in frame t and every joint in a first frame.

5. The method of claim 1, wherein the plurality of spherical bins is divided into a plurality of equal bins.

6. The method of claim 5, comprising:
   eliminating movement noise by adding an inner spherical bin, and wherein the inner spherical bin is separate from the plurality of equal bins.

7. The method of claim 1, comprising:
   before applying the HOG algorithm, equally dividing the energy map into a plurality of overlapped regions, wherein for each point in an overlapped region, a Y-gradient is a difference between its upper and lower neighbor in a Y-axis, and a X-gradient is the difference between its right and left neighbor in a X-axis; and
   computing a tangent angle according to Y-gradients/X-gradients and projecting the tangent angle into several bins to form a histogram within the overlapped region.

8. The method of claim 7, comprising:
   concatenating each of the histograms within the overlapped regions to obtain the single column vector.

9. A system for recognition of behavior, the system comprising:
   a video camera configured to capture at least one video stream of data on one or more subjects, wherein the at least one video stream data comprises a plurality of frames; and
   one or more processors having executable instructions for:
   extracting body skeleton data from each frame of the at least one video stream of data;
   computing feature extractions on each joint of the extracted body skeleton data for each frame of the extracted body skeleton data, wherein the extracted features of the joint of the body skeleton describes a speed feature, a movement feature, and a pose feature of the joint of the body skeleton data, wherein:
   the pose feature describes a relative position between joint n and every other joint in each frame t;
   the speed feature describes a relative position between joint n in frame t and every joint in a preceding frame (t−k), where k is a parameter of speed estimation step size; and
   the movement features describes the relative position between joint n in frame t and every joint in a first frame;
   generating a plurality of histograms for each frame by respectively projecting the extracted features for each frame to a spherical coordinate system having a plurality of spherical bins;
   generating an energy map for each of the plurality of histograms by mapping the plurality of spherical bins versus time;
   applying a Histogram of Oriented Gradients (HOG) algorithm on the plurality of energy maps to generate a single column vector; and
   classifying the single column vector as a behavior and/or emotion.

10. The system of claim 9, wherein the parameter depends on the frame rate of recorded action video, and can be a minimum gap between frame (t−k) and frame t to show an obvious movement for a joint n if it has a significant activity during that period.

11. The system of claim 9, wherein the plurality of spherical bins is divided into a plurality of equal bins; and
   eliminating movement noise by adding an inner spherical bin, wherein the inner spherical bin is separate from the plurality of equal bins.

12. The system of claim 9, comprising:
   before applying the HOG algorithm, equally dividing the energy map into a plurality of overlapped regions, wherein for each point in an overlapped region, a Y-gradient is a difference between its upper and lower neighbor in a Y-axis, and a X-gradient is the difference between its right and left neighbor in a X-axis; and
   computing a tangent angle according to Y-gradients/X-gradients and projecting the tangent angle into several bins to form a histogram within the overlapped region.

13. A non-transitory computer readable medium containing a computer program having computer readable code embodied therein for recognition of behavior, comprising:
   extracting body skeleton data from each frame of the at least one video stream of data;
   computing feature extractions on each joint of the extracted body skeleton data for each frame of the extracted body skeleton data, wherein the extracted features of the joint of the body skeleton describes a speed feature, a movement feature, and a pose feature of the joint of the body skeleton data, wherein the speed feature describes a relative position between joint n in frame t and every joint in a preceding frame (t−k), where k is a parameter of speed estimation step size;
   generating a plurality of histograms for each frame by respectively projecting the extracted features for each frame to a spherical coordinate system having a plurality of spherical bins;

generating an energy map for each of the plurality of histograms by mapping the plurality of spherical bins versus time;
applying a Histogram of Oriented Gradients (HOG) algorithm on the plurality of energy maps to generate a single column vector; and
classifying the single column vector as a behavior and/or emotion.

14. The non-transitory computer readable medium of claim 13, wherein the pose feature describes a relative position between joint n and every other joint in each frame t, and the movement features describes the relative position between joint n in frame t and every joint in a first frame; and
wherein the parameter depends on the frame rate of recorded action video, and can be a minimum gap between frame (t−k) and frame t to show an obvious movement for a joint n if it has a significant activity during that period.

15. The non-transitory computer readable medium of claim 13, wherein the plurality of spherical bins is divided into a plurality of equal bins; and
eliminating movement noise by adding an inner spherical bin, wherein the inner spherical bin is separate from the plurality of equal bins.

16. The non-transitory computer readable medium of claim 13, comprising:
before applying the HOG algorithm, equally dividing the energy map into a plurality of overlapped regions, wherein for each point in an overlapped region, a Y-gradient is a difference between its upper and lower neighbor in a Y-axis, and a X-gradient is the difference between its right and left neighbor in a X-axis; and
computing a tangent angle according to Y-gradients/X-gradients and projecting the tangent angle into several bins to form a histogram within the overlapped region.

* * * * *